United States Patent
Wang (10) Patent No.: US 9,834,182 B2
(45) Date of Patent: Dec. 5, 2017

(54) PORTABLE TUBELESS TIRE INFLATING DEVICE

(71) Applicant: Lo Pin Wang, Taichung (TW)

(72) Inventor: Lo Pin Wang, Taichung (TW)

(73) Assignee: Beto Engineering & Marketing Co., Ltd., Taichung (TW)

( * ) Notice: Subject to any disclaimer, the term of this patent is extended or adjusted under 35 U.S.C. 154(b) by 28 days.

(21) Appl. No.: 14/961,953

(22) Filed: Dec. 8, 2015

(65) Prior Publication Data

US 2017/0158174 A1     Jun. 8, 2017

(51) Int. Cl.
   *F04F 1/00*     (2006.01)
   *B60S 5/04*     (2006.01)

(52) U.S. Cl.
   CPC .................................... *B60S 5/043* (2013.01)

(58) Field of Classification Search
   CPC .......... B60S 5/043; F04B 41/02; F04B 49/03; F04B 9/14; Y10T 137/3584; Y10T 137/3724; Y10T 137/86324; Y10T 137/86099; B65D 83/42; B67D 7/0205
   USPC ..... 141/18, 21, 29, 38, 39, 307; 137/565.12, 137/565.13, 565.25, 587, 883
   See application file for complete search history.

(56) References Cited

U.S. PATENT DOCUMENTS

| | | | | |
|---|---|---|---|---|
| 2,033,329 A | * | 3/1936 | Craig | B67D 1/12 137/170.4 |
| 2,126,367 A | * | 8/1938 | Clawson | B65D 90/30 137/587 |
| 3,064,673 A | * | 11/1962 | Rockwell | F16K 17/04 137/494 |
| 3,152,609 A | * | 10/1964 | Hegna | B60K 15/0406 137/587 |
| 4,508,490 A | * | 4/1985 | Ramirez | F04B 33/00 417/234 |
| 5,042,547 A | | 8/1991 | Van De Sype | |
| 5,884,659 A | | 3/1999 | Prosser et al. | |
| 7,188,518 B2 | | 3/2007 | Gonzaga | |
| 2014/0061245 A1 | * | 3/2014 | McNulty | A47K 5/14 222/190 |

* cited by examiner

*Primary Examiner* — Jessica Cahill
*Assistant Examiner* — Angelisa L Hicks
(74) *Attorney, Agent, or Firm* — Charles E. Baxley (57) ABSTRACT

An inflating device includes a bottle for containing a pressurized air, a housing is secured to the bottle and includes an orifice communicating with an inner chamber of the bottle, a valve piece is engaged in the housing and includes a shank engaged in the orifice of the housing, and a spring biasing member is engaged with the valve piece for biasing the valve piece to engage with the housing and to make an air tight seal between the housing and the valve piece. The pressurized air and a fluid contained in the bottle are allowed to flow out through the orifice of the housing when the pressurized air includes a pressure greater than a spring biasing force of the spring biasing member.

13 Claims, 15 Drawing Sheets

PORTABLE TUBELESS TIRE INFLATING DEVICE

BACKGROUND OF THE INVENTION

1. Field of the Invention

The present invention relates to a portable tubeless tire inflating device, and more particularly to a portable tubeless tire inflating device including a pressure relief valve device for partially releasing the pressurized air and for discharging the water or fluid contained in the portable tubeless tire inflating device, and for preventing the portable tubeless tire inflating device from being easily and quickly damaged.

2. Description of the Prior Art

Various kinds of typical portable tubeless tire inflating devices have been developed and provided for quickly and rapidly inflating the tubeless tire or the like, and comprise a bottle for receiving or containing a pressurized air and for supplying the pressurized air to inflate the tubeless tire or the like.

For example, U.S. Pat. No. 5,042,547 to Van De Sype, U.S. Pat. No. 5,884,659 to Prosser et al., and U.S. Pat. No. 7,188,518 to Gonzaga disclose several of the typical portable tubeless tire inflating devices each also comprising a bottle for receiving or containing a pressurized air and for supplying the pressurized air to inflate the tubeless tire or the like.

However, while introducing or feeding or supplying the pressurized air into the bottle, a water or moisture or fluid may also be introduced or supplied into the bottle, and the water or moisture or fluid contained in the bottle may not be suitably discharge from the bottle, and may then be introduced or supplied into the tubeless tire or the like.

In addition, when the pressurized air introduced or supplied into the bottle is over-pressurized or when the pressurized air includes a pressure greater than a predetermined value, the over-pressurized air may not be suitably released or discharged and may damage the bottle or the typical portable tubeless tire inflating devices.

The present invention has arisen to mitigate and/or obviate the afore-described disadvantages of the conventional portable tubeless tire inflating devices.

SUMMARY OF THE INVENTION

The primary objective of the present invention is to provide a portable tubeless tire inflating device including a pressure relief valve device for partially releasing the pressurized air and for discharging the water or fluid contained in the portable tubeless tire inflating device, and for preventing the portable tubeless tire inflating device from being easily and quickly damaged.

In accordance with one aspect of the invention, there is provided an inflating device comprising a bottle including a chamber formed therein for containing a pressurized air, and including an opening formed in the bottle and communicating with the chamber of the bottle, a housing secured to the bottle, the housing including an orifice communicating with the chamber of the bottle for allowing the pressurized air contained in the chamber of the bottle to selectively flow out through the orifice of the housing, a valve piece slidably received and engaged in the compartment of the housing, and the valve piece including a shank slidably received and engaged in the orifice of the housing for guiding the valve piece to move along the housing, and a spring biasing member engaged with the valve piece for biasing and forcing the valve piece to engage with the housing and to make an air tight seal between the housing and the valve piece and to prevent the pressurized air from flowing out through the orifice of the housing, and for allowing the pressurized air to be released and to flow out through the orifice of the housing when the pressurized air includes a pressure greater than a spring biasing force of the spring biasing member.

The housing includes a sealing ring disposed on the valve piece for selectively engaging with the housing and for selectively making the air tight seal between the housing and the valve piece. The valve piece includes a shank extended therefrom and engaged with the sealing ring.

The valve piece includes a peripheral flange extended therefrom and located around the shank for forming a peripheral recess between the shank and the peripheral flange and for engaging with the sealing ring.

The housing includes a compartment formed therein and communicating with the orifice of the housing for slidably engaging with the valve piece, and the compartment of the housing includes an inner diameter greater than that of the orifice of the housing for forming an inner peripheral shoulder in the housing and for engaging with the sealing ring.

The housing includes an inner thread formed therein, and a cap includes an outer thread engaged with the inner thread of the housing for detachably attaching the cap to the housing, the cap is engaged with the spring biasing member and retaining the valve piece and the spring biasing member within the housing.

A knob may further be provided and engaged with the valve piece for moving the valve piece along the housing. The housing includes a groove formed therein for slidably engaging with the valve piece. The valve piece includes an aperture formed therein for selectively aligning with the groove of the housing and for engaging with the knob and for allowing the valve piece to be moved along the housing with the knob.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Referring to the drawings, and initially to FIGS. 1-2 and 5-6, a portable tubeless tire inflating device in accordance with the present invention comprises a container or bottle 10 disposed or supported on a supporting base 11 and arranged for allowing the bottle 10 to be erected or supported on a supporting surface or on the ground, the bottle 10 includes a compartment or chamber 12 formed therein for receiving or containing a pressurized air, and includes an opening 13 formed in the lower or bottom portion 14 thereof (FIGS. 6, 9, 10) and communicating with the chamber 12 of the bottle 10 for allowing the pressurized air received or contained in the chamber 12 of the bottle 10 to selectively flow out through the opening 13 of the bottle 10.

The bottle 10 includes an inlet port or mouth 15 formed or provided on the upper portion 16 thereof for selectively introducing or feeding or supplying the pressurized air into the chamber 12 of the bottle 10, and includes a hose 17 and an inflation nozzle 18 connected or coupled to the bottle 10 (FIGS. 1, 2) for selectively supplying the pressurized air out of the bottle 10 in order to inflate the tubeless tire (not illustrated) or the other inflatable materials. The above-described structure or configuration for the hose 17 and the inflation nozzle 18 and the inlet port or mouth 15 is typical and is not related to the present invention and will not be described in further details. The tire inflating device includes a cap or cover 20 attached or mounted or secured in the upper portion 16 of the bottle 10 for covering or sealing the chamber 12 of the bottle 10, and having an aperture 21 formed in the cover 20 and communicating with the chamber 12 of the bottle 10.

As shown in FIGS. 2-10, a pressure relief valve device 3 is attached or mounted or secured to the bottle 10 for selectively releasing the pressurized air received or contained in the chamber 12 of the bottle 10, particularly when the bottle is over-pressurized. For example, the pressure relief valve device 3 includes a receptacle or housing 30 having a stud or protrusion 31 extended upwardly from the upper portion 32 thereof for engaging with or into the opening 13 of the bottle 10 and for attaching or mounting or securing to the bottle 10 with latches or fasteners (not illustrated) or with adhesives or welders or the like. The housing 30 includes an orifice 33 formed in the protrusion 31 and/or the upper portion 32 thereof and communicating with the chamber 12 of the bottle 10, and includes a chamber or compartment 34 formed therein and communicating with the orifice 33 of the housing 30.

Figure 6:
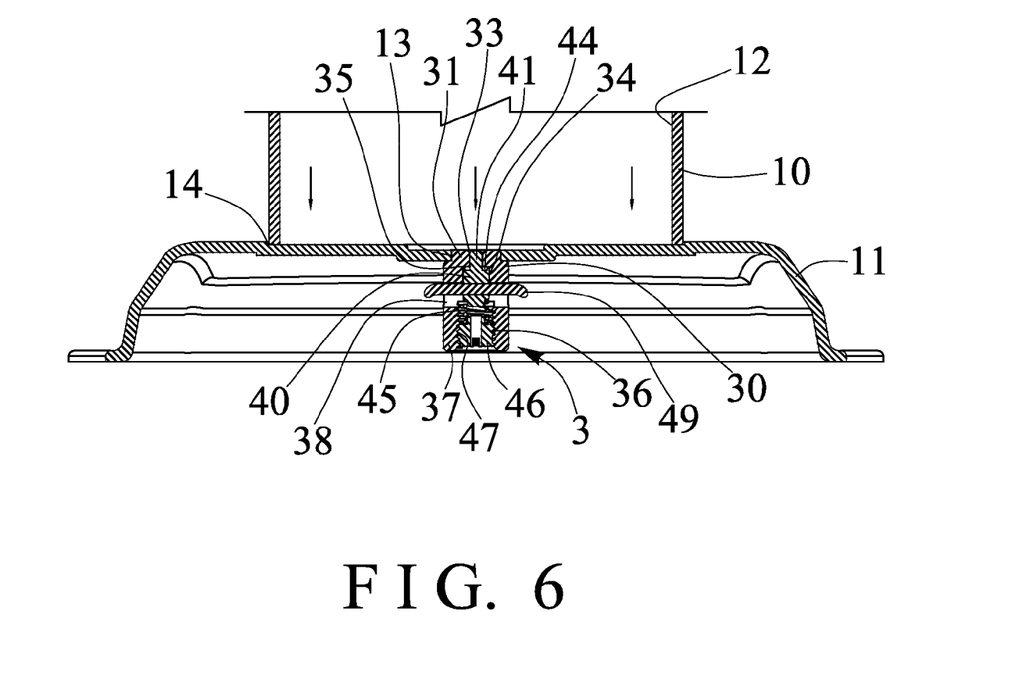
FIG. 6 is another partial cross sectional view taken along lines 6-6 of FIG. 5.
Figure 9:
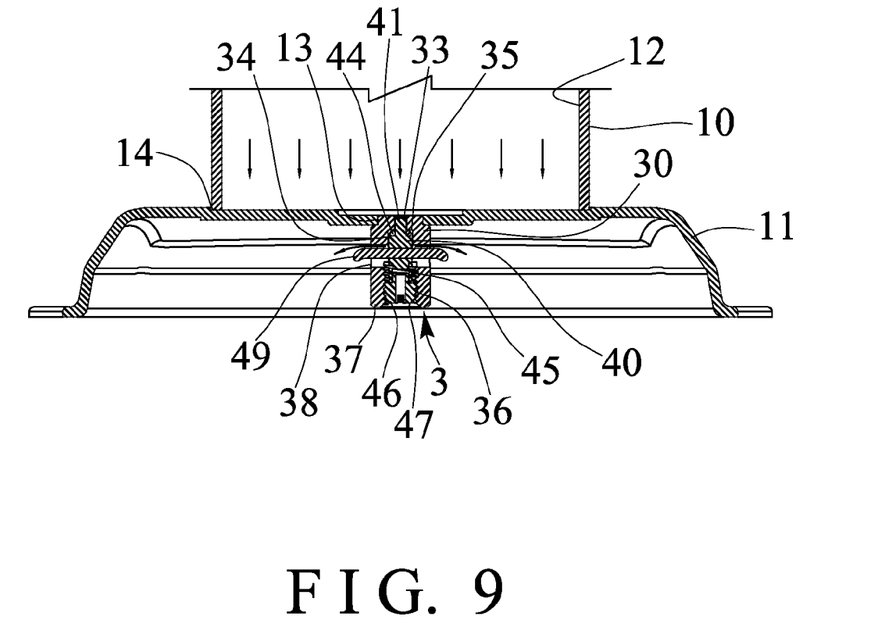
FIGS. 9, 10 are partial cross sectional views similar to FIG. 6, illustrating the operation of the portable tubeless tire inflating device.
Figure 10:
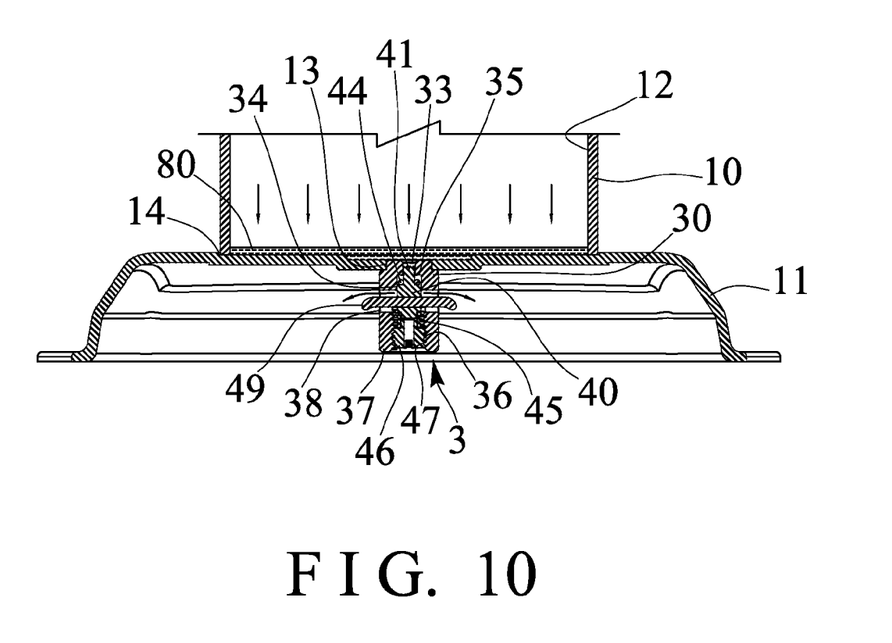

As shown in FIGS. 6 and 9-10, the compartment 34 of the housing 30 includes an inner diameter greater than that of the orifice 33 of the housing 30 for forming or defining an inner peripheral shoulder 35 in the housing 30, and the housing 30 includes a screw hole or inner thread 36 formed therein, such as formed in the lower or bottom portion 37 thereof and includes an oblong hole or groove 38 formed therein, such as formed in the middle or intermediate portion 39 thereof and intersected or communicating with the compartment 34 of the housing 30 and arranged for allowing the pressurized air received or contained in the chamber 12 of the bottle 10 to selectively flow out through the orifice 33 and the compartment 34 and the groove 38 of the housing 30 selectively (FIGS. 9, 10).

A valve piece 40 is slidably received or engaged in the compartment 34 of the housing 30, and includes a shank 41 extended upwardly therefrom and slidably received or engaged in the orifice 33 of the housing 30 for guiding the valve piece 40 to move up and down along the compartment 34 of the housing 30, and includes a peripheral flange 42 extended upwardly therefrom and located around the shank 41 for forming or defining a peripheral recess 43 between the shank 41 and the peripheral flange 42 and for receiving or engaging with a sealing ring 44, in which the sealing ring 44 is disposed on the valve piece 40 and includes a height greater than that of the peripheral flange 42 for allowing the sealing ring 44 to be contacted or engaged with the inner peripheral shoulder 35 of the housing 30, and for making an air or water tight seal between the housing 30 and the valve piece 40 (FIG. 6) and for preventing the pressurized air from flowing flow out through the orifice 33 of the housing 30.

A spring biasing member 45 is disposed or engaged into the compartment 34 of the housing 30 and contacted or engaged with the valve piece 40 for biasing and forcing or moving the valve piece 40 and/or the sealing ring 44 to engage with the inner peripheral shoulder 35 of the housing 30 and to make the air or water tight seal between the housing 30 and the valve piece 40, and a lid or cap 46 includes an outer thread 47 for threading or engaging with the inner thread 36 of the housing 30 and for detachably or removably attaching or mounting or securing the cap 46 to the housing 30 and for contacting or engaging with the spring biasing member 45 and for solidly and stably anchoring or retaining or positioning the valve piece 40 and the spring biasing member 45 within the compartment 34 of the housing 30.

The valve piece 40 includes an aperture 48 laterally formed therein for selectively aligning with the groove 38 of the housing 30 and for engaging with a ring member or knob 49. The groove 38 of the housing 30 includes a length greater than the inner diameter of the aperture 48 of the valve piece 40 and/or greater than the outer diameter of the knob 49 for allowing the knob 49 to be moved or slid along the groove 38 of the housing 30 and for allowing the valve piece 40 to be moved up and down along the compartment 34 of the housing 30, and thus for allowing the shank 41 of the valve piece 40 to be guided to move along the orifice 33 of the housing 30. The outer diameters of the shank 41 and of the valve piece 40 are smaller than the inner diameters of the orifice 33 and the compartment 34 of the housing 30 for allowing the pressurized air received or contained in the chamber 12 of the bottle 10 to selectively flow out through the orifice 33 and the compartment 34 and the groove 38 of the housing 30 when the sealing ring 44 and/or the valve piece 40 is disengaged from the inner peripheral shoulder 35 of the housing 30 (FIGS. 9, 10).

Figure 1:
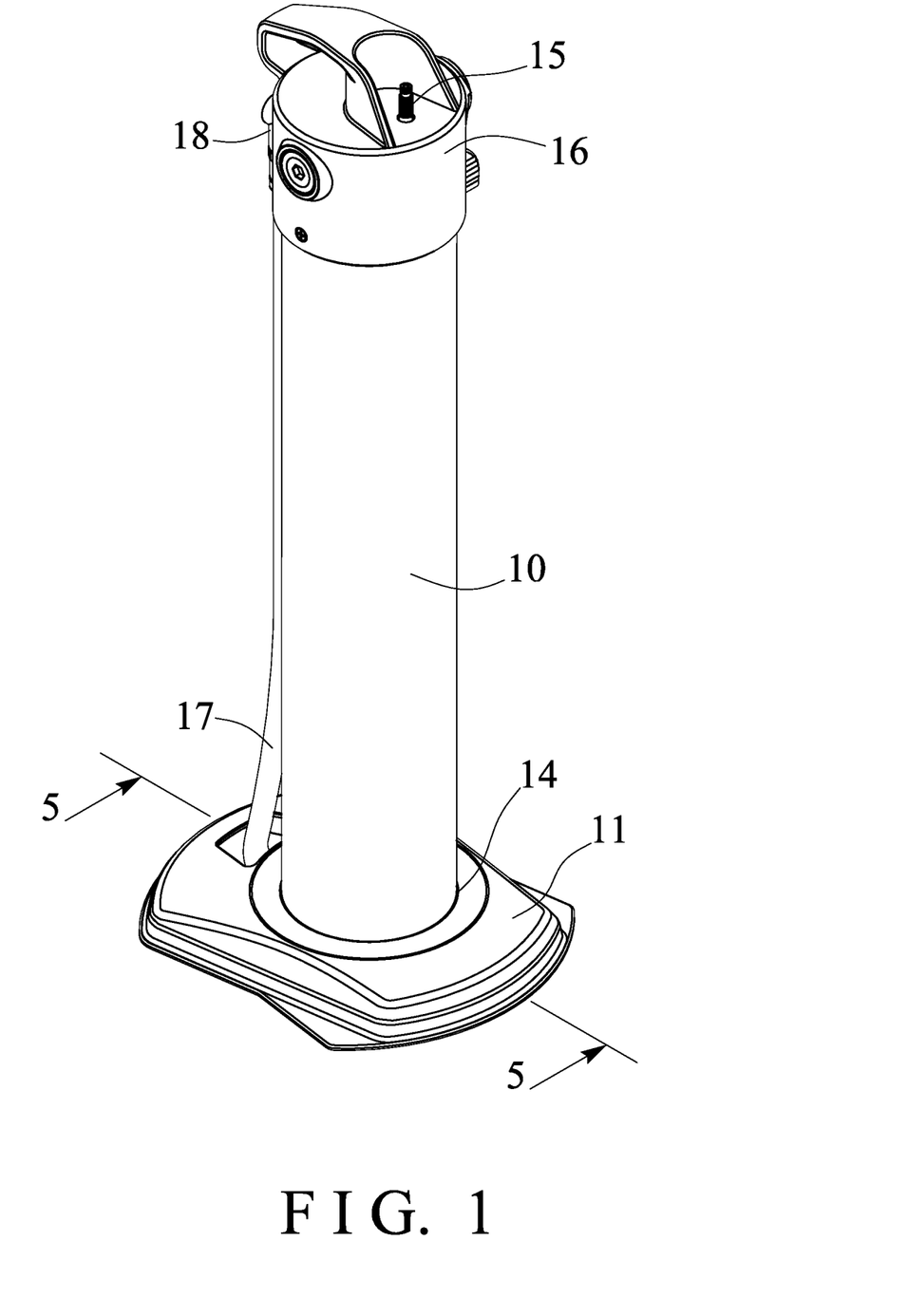
FIG. 1 is an upper perspective view of a portable tubeless tire inflating device in accordance with the present invention.
Figure 2:
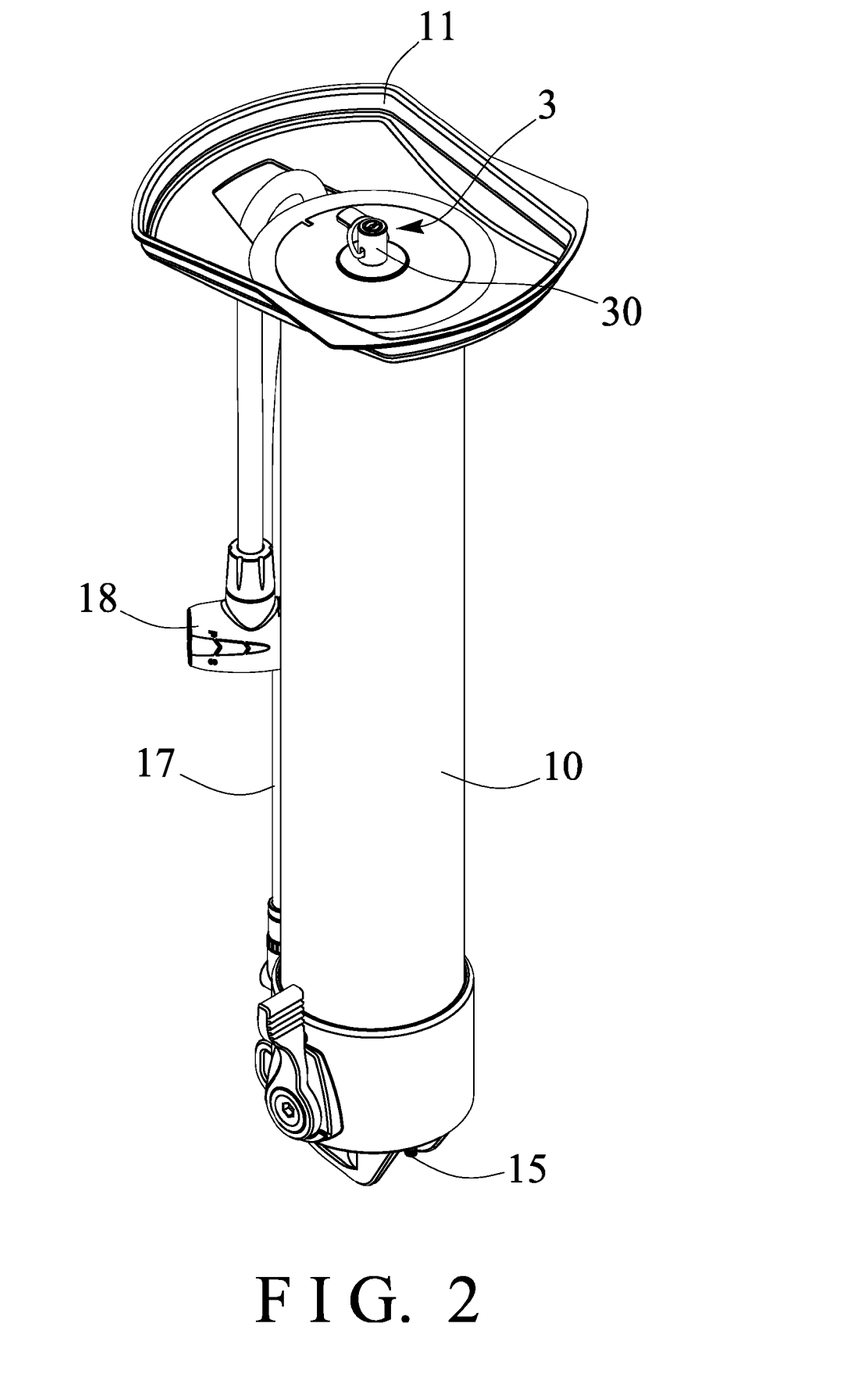
FIG. 2 is a perspective view of the portable tubeless tire inflating device which is disposed up-side-down.
Figure 3:
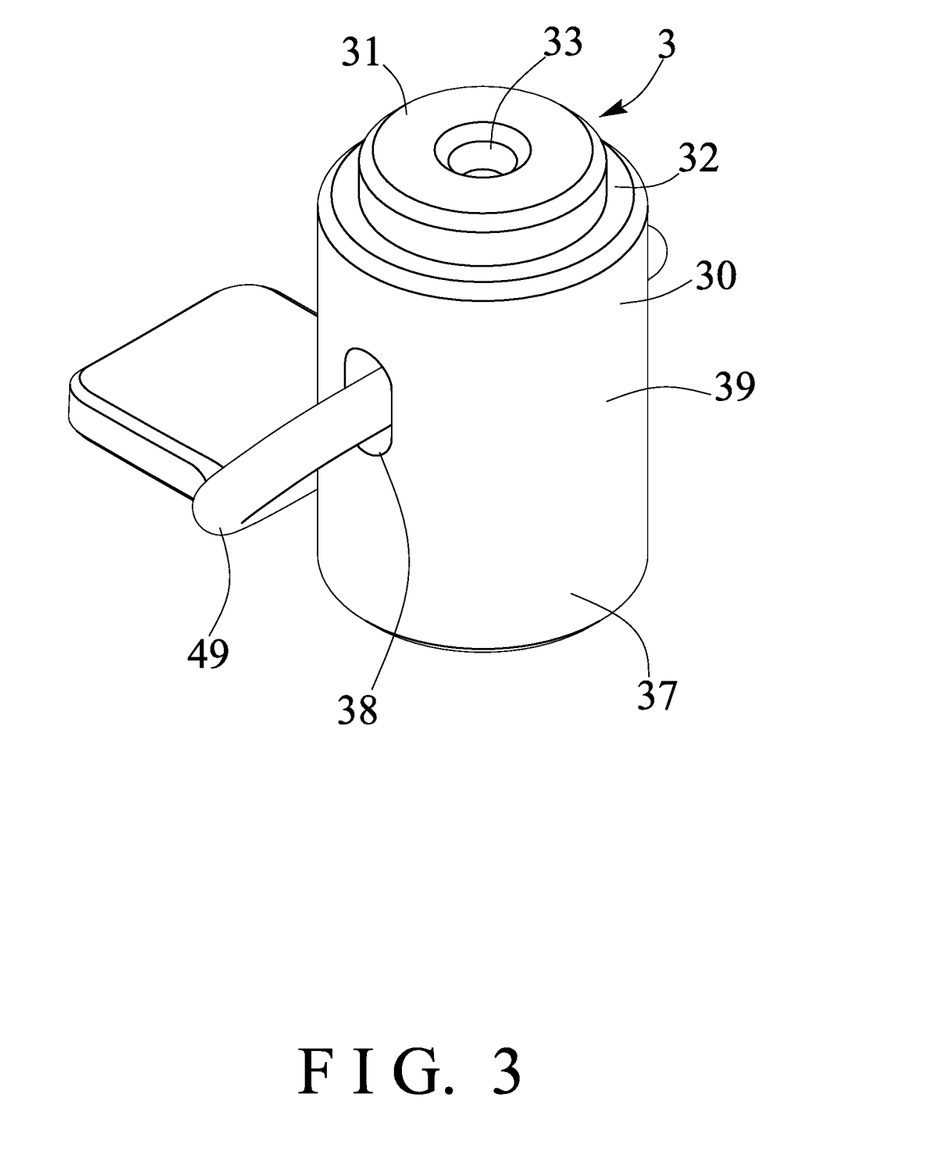
FIG. 3 is an enlarged partial perspective view illustrating a pressure relief valve device for the portable tubeless tire inflating device.
Figure 4:
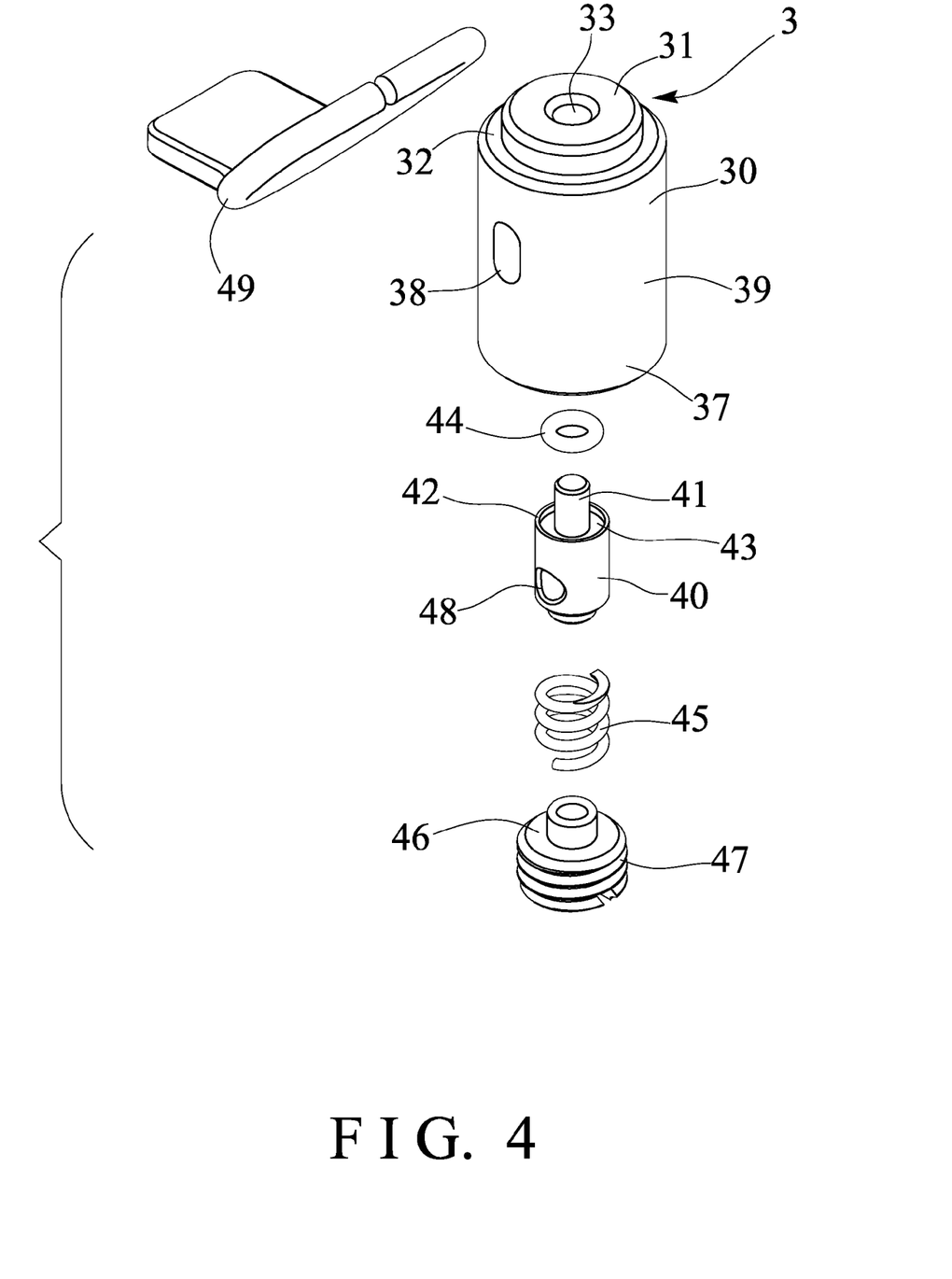
FIG. 4 is a partial exploded view of the pressure relief valve device for the portable tubeless tire inflating device.
Figure 5:
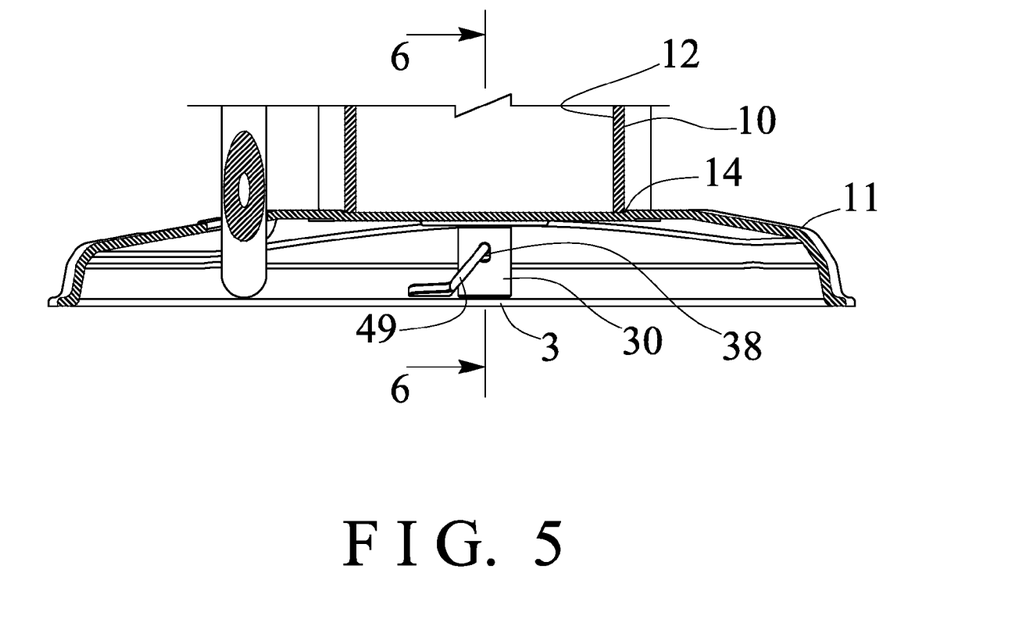
FIG. 5 is a partial cross sectional view of the portable tubeless tire inflating device, taken along lines 5-5 of FIG. 1.

In operation, as shown in FIGS. 5 and 6, when the pressurized air received or contained in the chamber 12 of the bottle 10 includes a pressure smaller than or no greater than a predetermined value that may overcome the spring biasing force of the spring biasing member 45, or smaller than or no greater than the spring biasing force of the spring biasing member 45, the spring biasing member 45 is good enough to bias and force or move the sealing ring 44 and/or the valve piece 40 to engage with the inner peripheral shoulder 35 of the housing 30 and to make the air or water tight seal between the housing 30 and the valve piece 40 and to prevent the pressurized air from flowing out through the orifice 33 of the housing 30.

Figure 7:
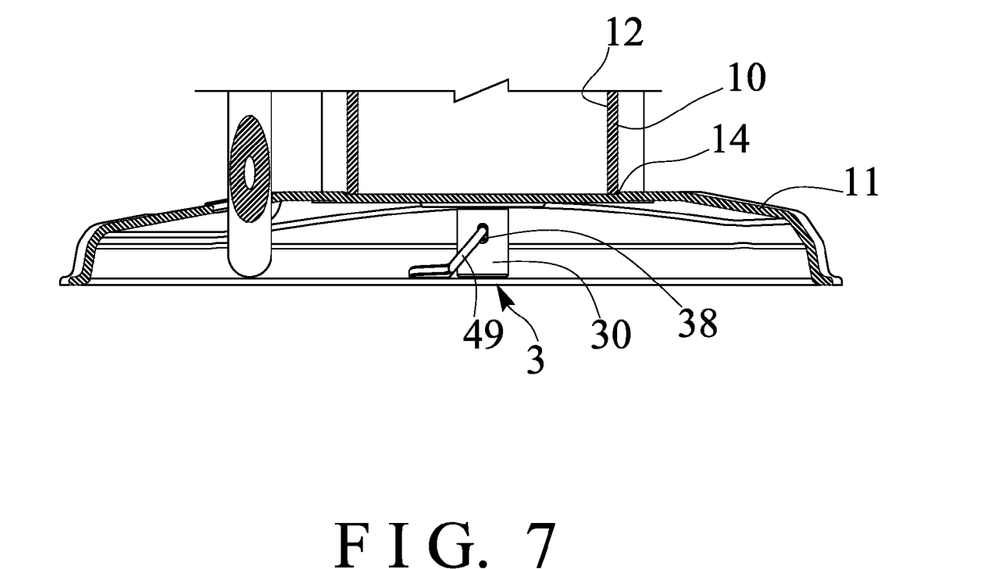
FIGS. 7, 8 are partial cross sectional views similar to FIG. 5, illustrating the operation of the portable tubeless tire inflating device.

As shown in FIGS. 7 and 9, when the pressurized air received or contained in the chamber 12 of the bottle 10 includes a pressure greater than the predetermined value that may overcome the spring biasing force of the spring biasing member 45, or greater than the spring biasing force of the spring biasing member 45, the pressurized air may force the shank 41 and the valve piece 40 to move or slide relative to the housing 30, and thus may force the valve piece 40 and/or the sealing ring 44 to be disengaged or separated from the inner peripheral shoulder 35 of the housing 30, and thus may release the air or water tight seal between the housing 30 and the valve piece 40, and thus for allowing the pressurized air to slightly flow out through the orifice 33 and the compartment 34 and the groove 38 of the housing 30.

Figure 8:
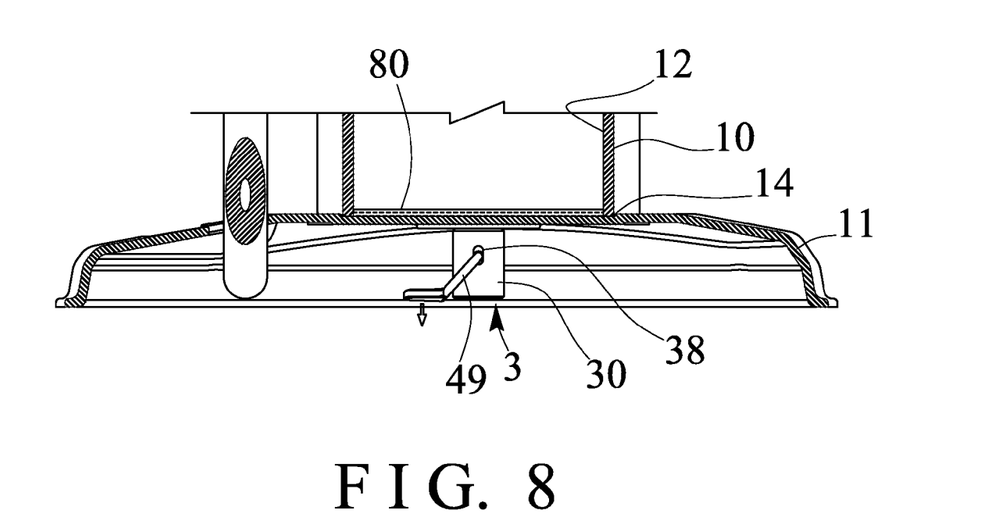

As shown in FIGS. 8 and 10, when a water or fluid 80 is generated or contained within the chamber 12 of the bottle 10 and/or when the pressurized air includes a pressure greater than the predetermined value that may overcome the spring biasing force of the spring biasing member 45, or greater than the spring biasing force of the spring biasing member 45, and/or when it is required to discharge the water or fluid 80 contained in the chamber 12 of the bottle 10, the knob 49 may be moved or slid along the groove 38 of the housing 30 by the user, for example, in order to move the shank 41 and the valve piece 40 along the orifice 33 and the compartment 34 of the housing 30, and thus to disengage or separate the valve piece 40 and/or the sealing ring 44 from the inner peripheral shoulder 35 of the housing 30, and thus for allowing of the pressurized air and the water or fluid 80 to flow out through the orifice 33 and the compartment 34 and the groove 38 of the housing 30.

Figure 11:
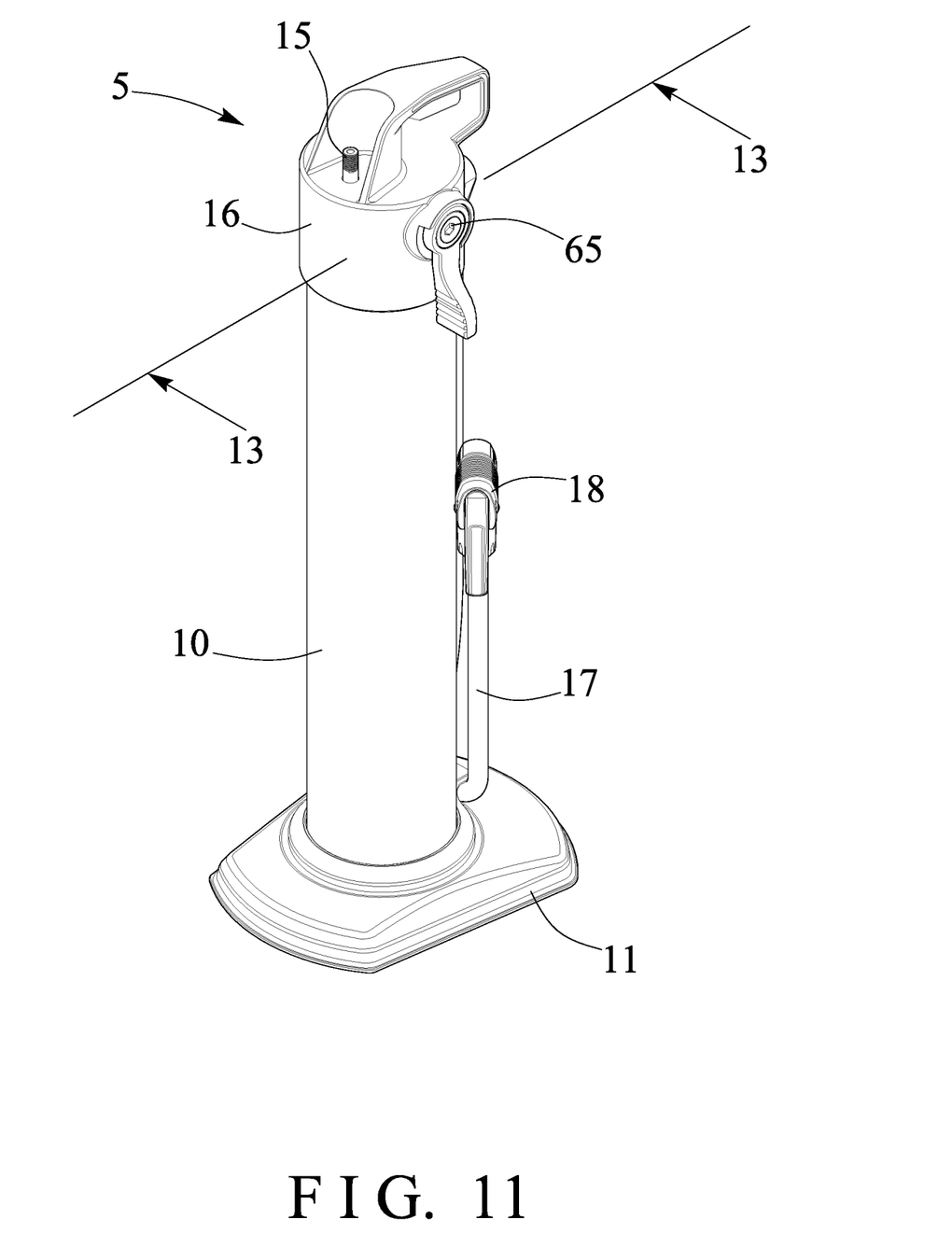
FIG. 11 is another upper perspective view of the portable tubeless tire inflating device as seen from a direction different from that shown in FIG. 1.
Figure 12:
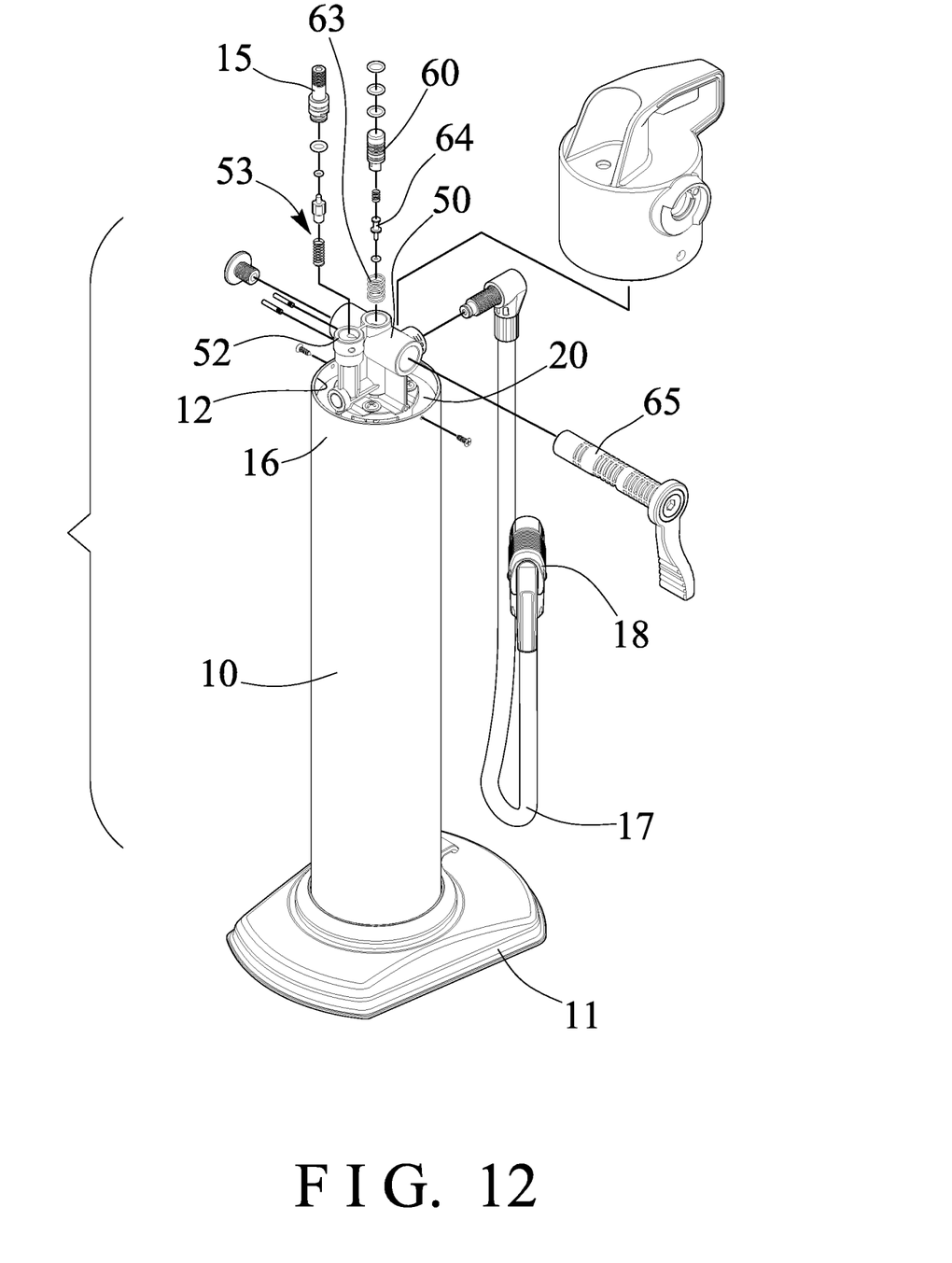
FIG. 12 is another partial exploded view of the portable tubeless tire inflating device.
Figure 13:
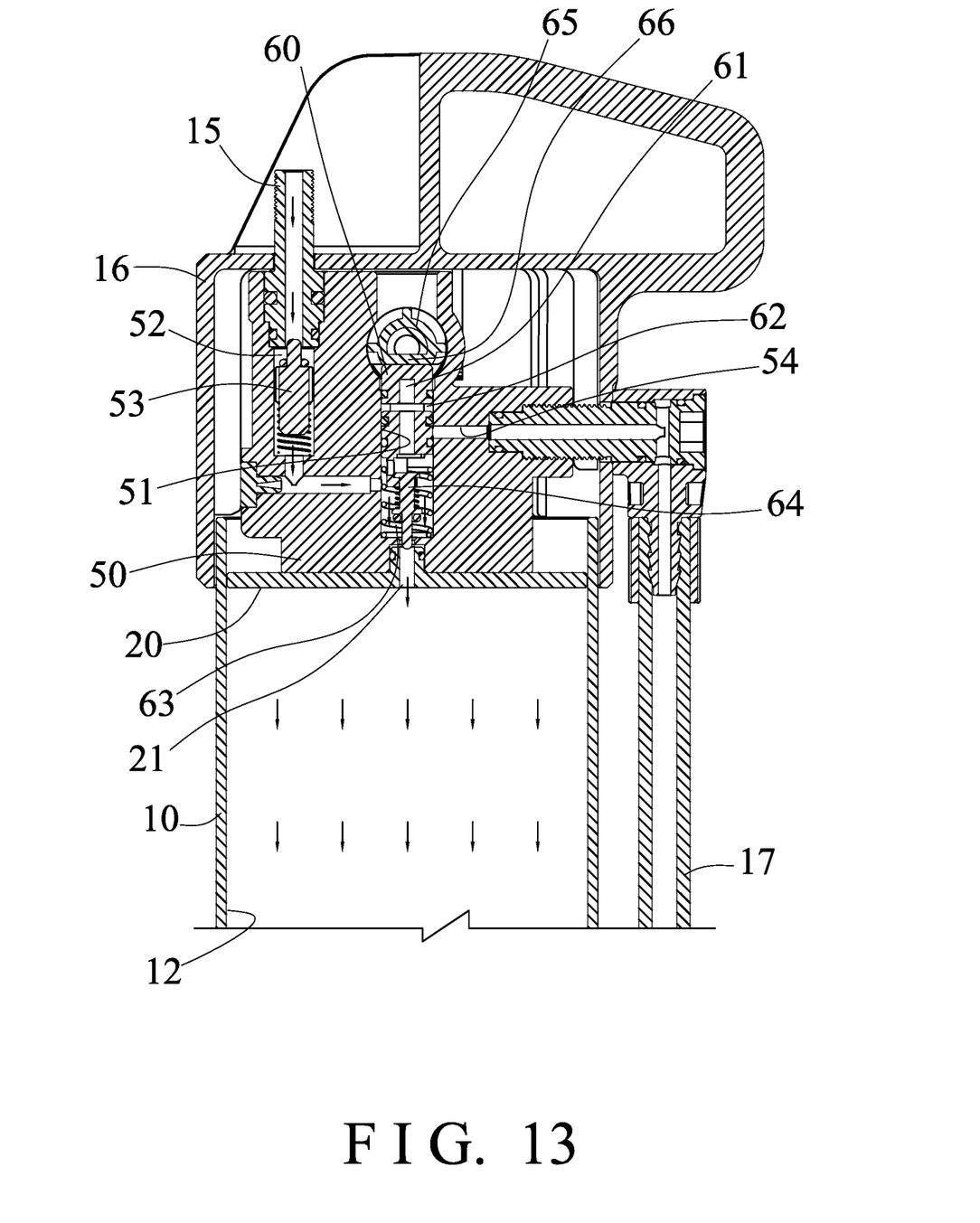
FIG. 13 is a partial cross sectional view of the portable tubeless tire inflating device, taken along lines 13-13 of FIG. 11.

As shown in FIGS. 11-13, the portable tubeless tire inflating device in accordance with the present invention further comprises a control valve device 5 including a receptacle or casing 50 disposed or attached or mounted or secured on top of the bottle 10 (FIGS. 12-18), and located and arranged above the cover 20 of the bottle 10, the casing 50 of the control valve device 5 includes a channel 51 formed in the central portion of the casing 50 and communicating with the aperture 21 of the cover 20 and/or the chamber 12 of the bottle 10, and further includes a manifold or pathway 52 formed and communicating with the channel 51 of the casing 50 for engaging with or connecting or coupling to the inlet mouth 15 and arranged for allowing the pressurized air to selectively flow from the inlet mouth 15 through the pathway 52 and the channel 51 of the casing 50 and then into the chamber 12 of the bottle 10.

A control valve or spring biased check valve 53 is disposed or attached or mounted or secured in the casing 50 and disposed or engaged into the pathway 52 of the casing 50 for controlling and limiting the pressurized air to flow only from the inlet mouth 15 into the channel 51 of the casing 50 and for preventing the pressurized air from flowing backward or out through the inlet mouth 15. The pressurized air supplied from the inlet mouth 15 may selectively flow to the channel 51 of the casing 50 and then into the chamber 12 of the bottle 10. The casing 50 further includes a bypass or passage 54 formed therein and communicating with the channel 51 of the casing 50 for connecting or coupling to the hose 17 and arranged for allowing the pressurized air supplied from the inlet mouth 15 to selectively flow into the channel 51 of the casing 50 and then into the passage 54 and thus for supplying the pressurized air to the hose 17.

A slidable valve stem or shank 60 is slidably received or engaged in the channel 51 of the casing 50, and includes a blind hole or bore 61 formed therein and communicating with the channel 51 and the pathway 52 of the casing 50, and includes a lateral slot 62 formed therein for selectively aligning with the passage 54 of the casing 50 (FIGS. 14-15, 17-18) and for selectively communicating the bore 61 of the shank 60 with the passage 54 of the casing 50, a spring biasing member 63 is disposed or engaged in the channel 51 of the casing 50 and engaged between the casing 50 and the shank 60 for biasing and disengaging the lateral slot 62 of the shank 60 from the passage 54 of the casing 50 (FIGS. 13, 16) and for preventing the pressurized air from flowing into the passage 54 of the casing 50. Another control valve or spring biased valve element 64 may further be provided and also engaged in the channel 51 of the casing 50 for controlling and guiding the pressurized air to flow through the bore 61 of the shank 60.

Figure 14:
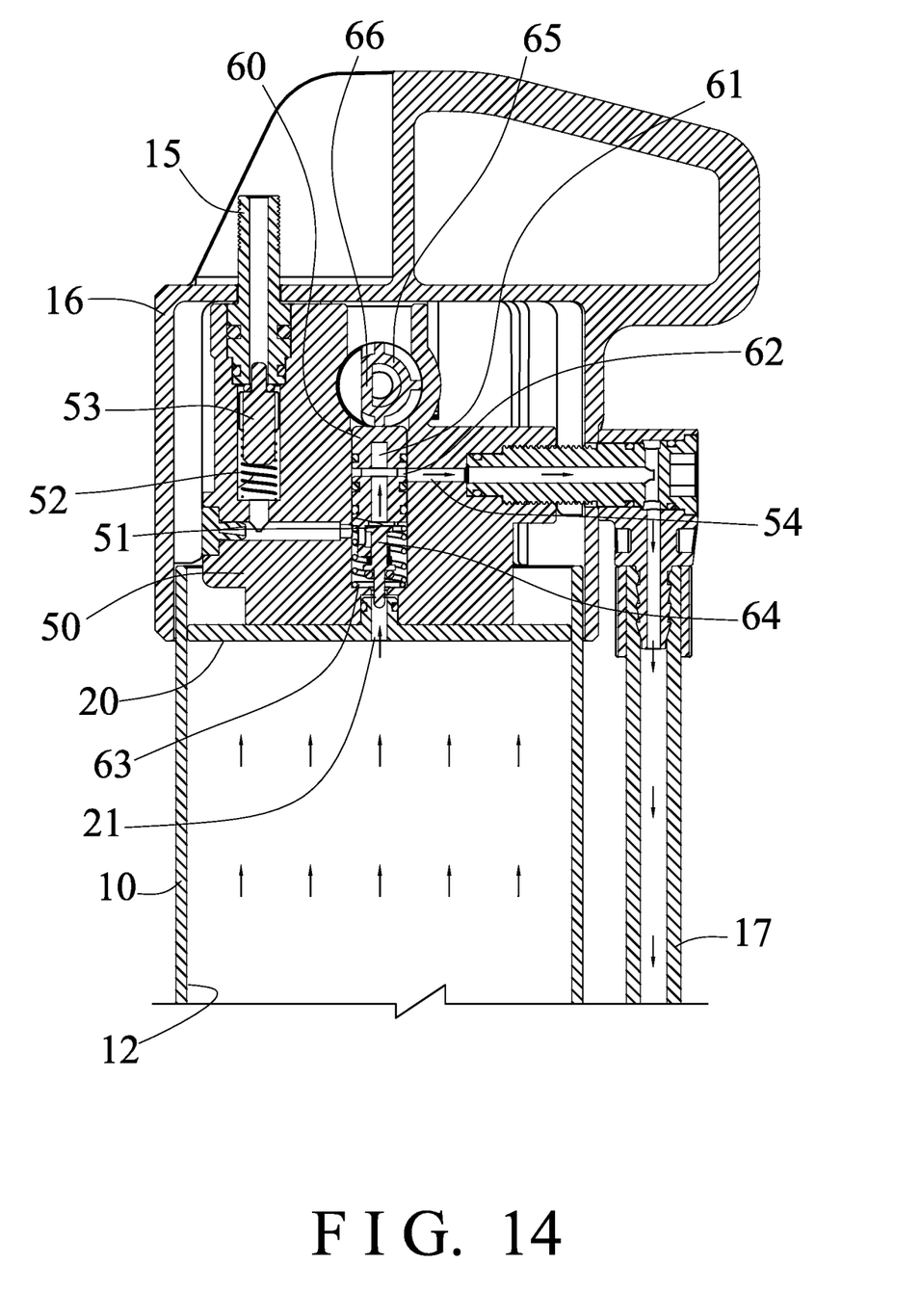
FIGS. 14 and 15 are partial cross sectional views similar to FIG. 13, illustrating the operation of the portable tubeless tire inflating device.

For example, as shown in FIG. 13, when the lateral slot 62 of the shank 60 is offset or spaced or disengaged from the passage 54 of the casing 50, the spring biased valve element 64 is arranged to allow the pressurized air to flow from the inlet mouth 15 into the chamber 12 of the bottle 10 and contained and stored in the chamber 12 of the bottle 10. As shown in FIG. 14, when the lateral slot 62 of the shank 60 is aligned with the passage 54 of the casing 50, the spring biased valve element 64 is arranged to allow the pressurized air to flow from the chamber 12 of the bottle 10 into the passage 54 of the casing 50, and then to flow out through the hose 17 selectively. Or, as shown in FIG. 15, when the chamber 12 of the bottle 10 is empty and has no pressurized air contained therein, the spring biased valve element 64 may also be arranged to allow the pressurized air to flow from the inlet mouth 15 into the passage 54 of the casing 50 and then to flow out through the hose 17 selectively.

Figure 15:
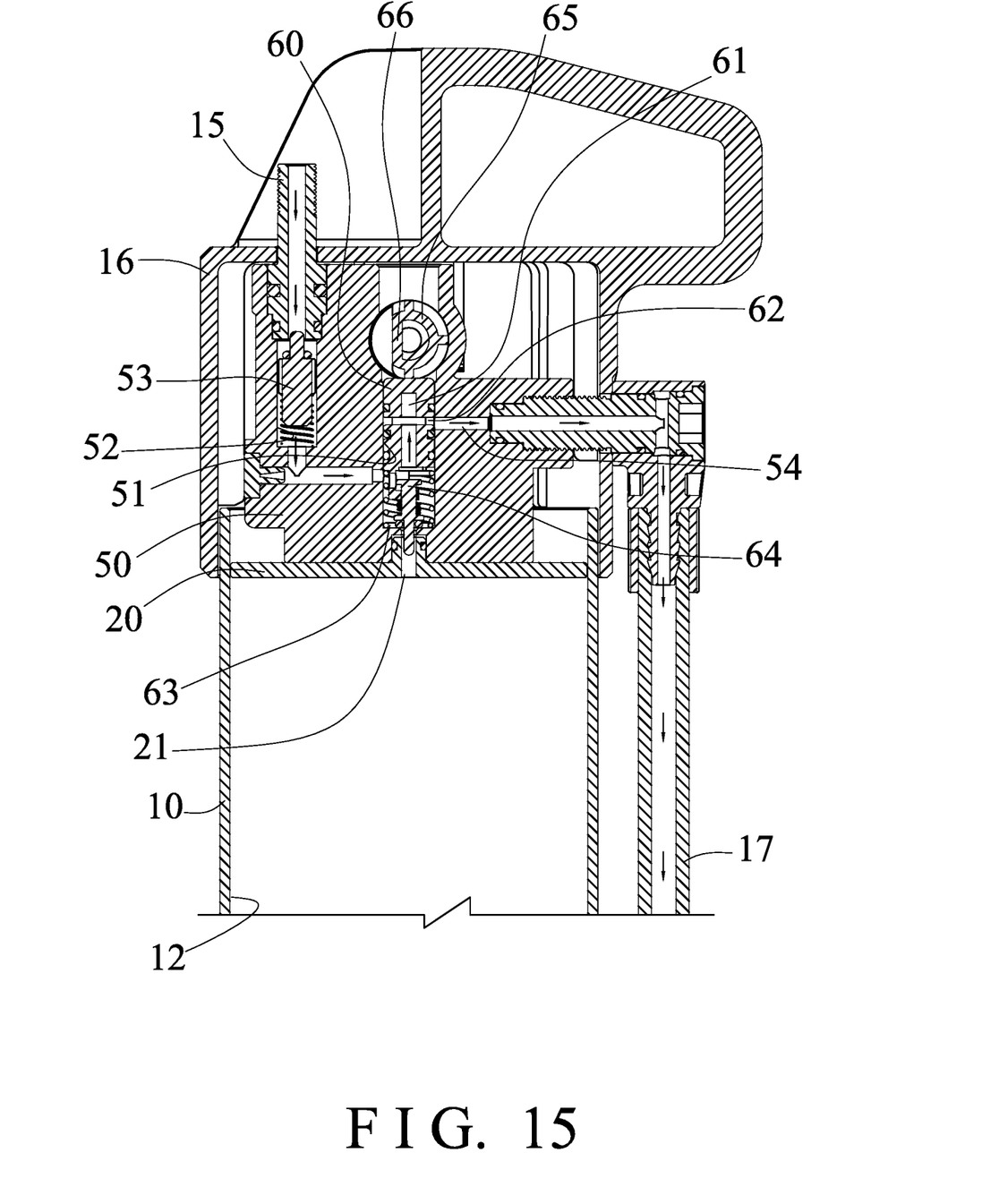
Figure 16:
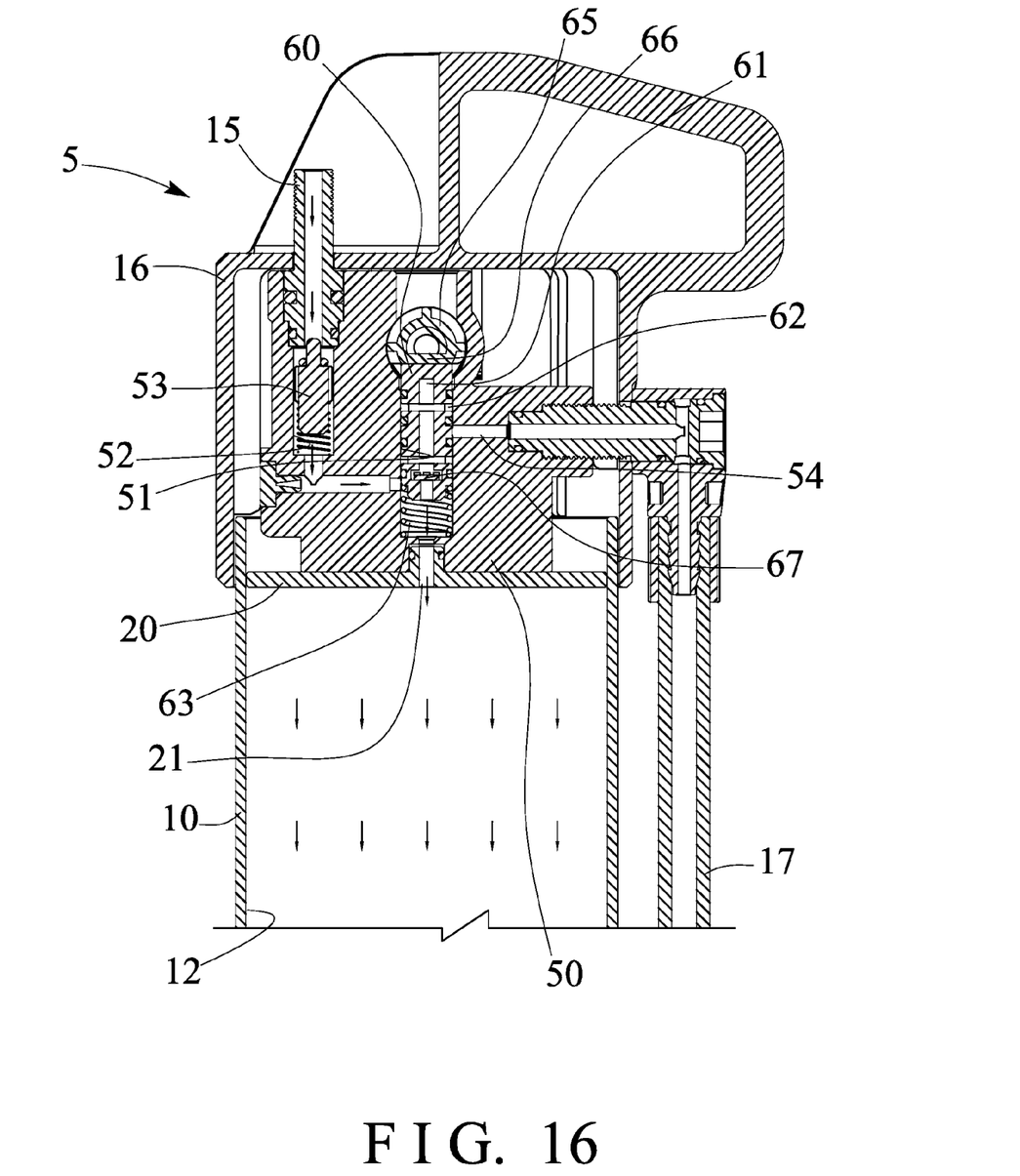
FIGS. 16, 17 and 18 are partial cross sectional views similar to FIGS. 13-15, illustrating the other arrangement of the portable tubeless tire inflating device.
Figure 17:
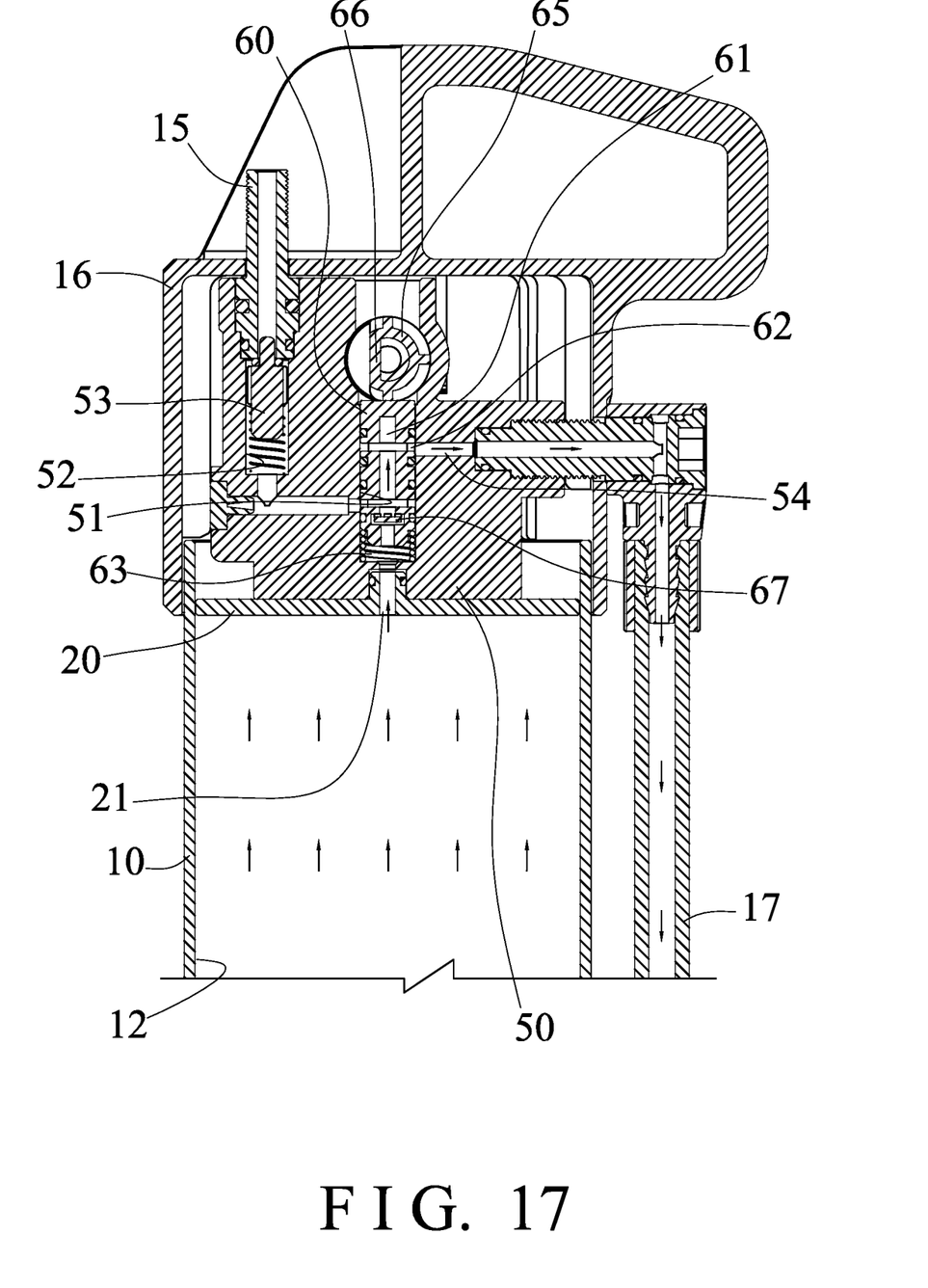
Figure 18:
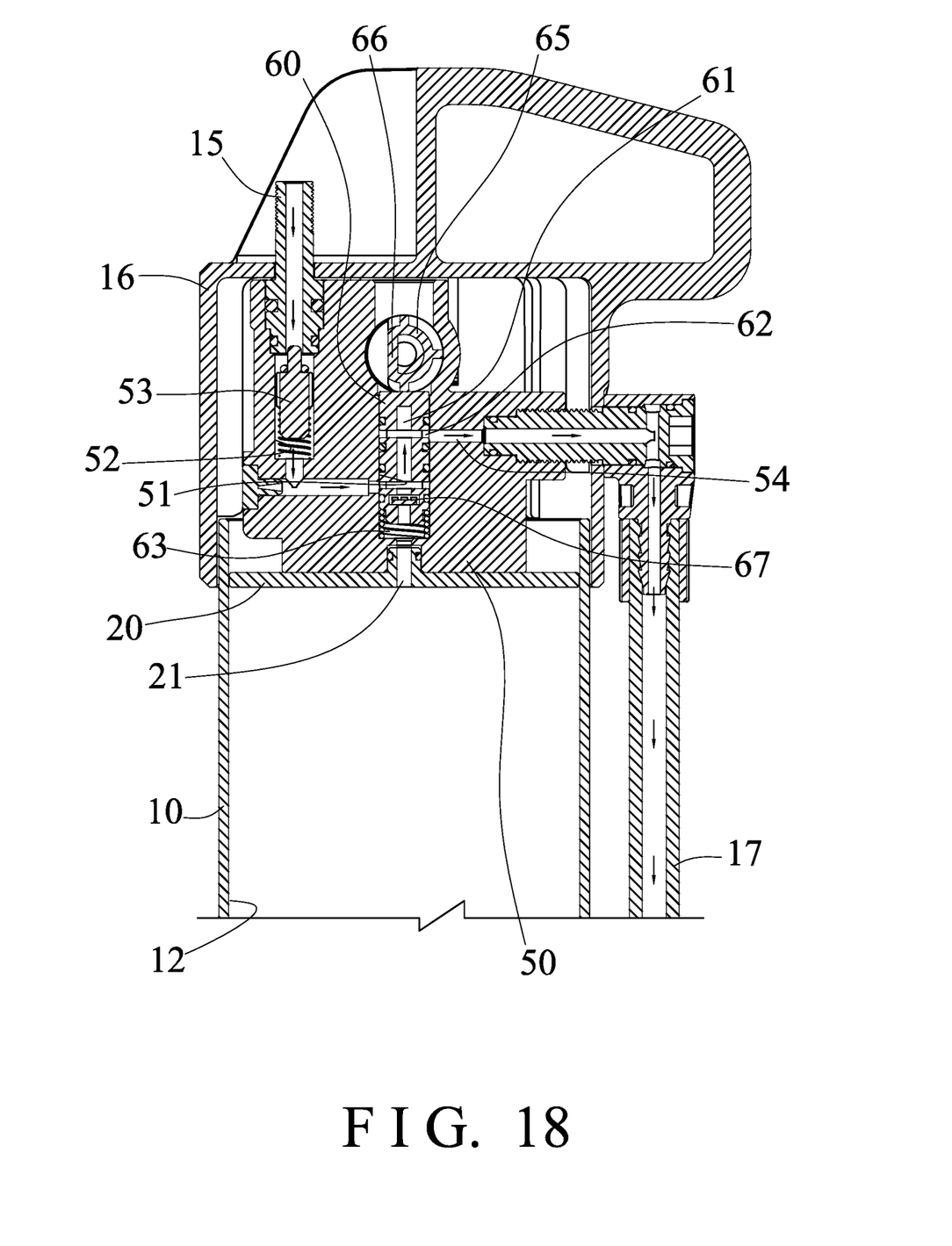

An actuating device or actuating rod 65 is pivotally or rotatably received or engaged in the casing 50, and the actuating rod 65 includes a cam member 66 formed or provided therein for selectively engaging with the valve shank 60 and for selectively actuating or moving the lateral slot 62 of the valve shank 60 to selectively align with the passage 54 of the casing 50, and thus to allow the pressurized air either to selectively flow from the chamber 12 of the bottle 10 into the passage 54 of the casing 50, and then to flow out through the hose 17 selectively (FIG. 14), or to selectively flow from the inlet mouth 15 into the passage 54 of the casing 50 and then to flow out through the hose 17 selectively (FIG. 15). Alternatively, as shown in FIGS. 16-18, the spring biased valve element 64 as shown in FIGS. 12-15 may be replaced with a blade type spring biased valve element 67.

In operation, as shown in FIG. 13, the pressurized air supplied into the inlet mouth 15 may selectively flow into the channel 51 of the casing 50 and then into the chamber 12 of the bottle 10, and contained and stored in the chamber 12 of the bottle 10. At this moment, the lateral slot 62 of the shank 60 is offset or spaced or disengaged from the passage 54 of the casing 50 such that the pressurized air may not flow out through the hose 17. When it is required to supplied the pressurized air into the passage 54 of the casing 50 and when the chamber 12 of the bottle 10 contains and stores the required pressurized air therein, the actuating rod 65 may be actuated to move the shank 60 onto or against the spring biasing member 63 and to align the lateral slot 62 of the shank 60 with the passage 54 of the casing 50 (FIG. 14), the pressurized air contained and stored in the chamber 12 of the bottle 10 may flow out through the passage 54 of the casing 50 and into the hose 17.

When the pressurized air contained and stored in the chamber 12 of the bottle 10 is emptied or when the chamber 12 of the bottle 10 has no pressurized air contained therein, as shown in FIG. 15, the pressurized air supplied into the inlet mouth 15 may directly flow into the channel 51 of the casing 50 and then into the passage 54 of the casing 50 and into the hose 17.

Accordingly, the portable tubeless tire inflating device in accordance with the present invention includes a pressure relief valve device for partially releasing the pressurized air and for discharging the water or fluid contained in the portable tubeless tire inflating device, and for preventing the portable tubeless tire inflating device from being easily and quickly damaged.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. An inflating device comprising:
   a bottle including a chamber formed therein for containing a pressurized air, and including an opening formed in said bottle and communicating with said chamber of said bottle,
   a housing secured to said bottle, said housing including an orifice communicating with said chamber of said bottle for allowing the pressurized air contained in said chamber of said bottle to selectively flow out through said orifice of said housing,
   a valve piece slidably received and engaged in said compartment of said housing, and said valve piece including a shank slidably received and engaged in said orifice of said housing for guiding said valve piece to move along said housing,
   a spring biasing member engaged with said valve piece for biasing and forcing said valve piece to engage with said housing and make an air tight seal between said housing and said valve piece and to prevent the pressurized air from flowing out through said orifice of said housing, and for allowing the pressurized air to flow out through said orifice of said housing when the pressurized air includes a pressure greater than a spring biasing force of said spring biasing member, and
   a control valve device disposed on said bottle for controlling the pressurized air to flow into said chamber of said bottle, said control valve device including a casing disposed on said bottle, said casing including a channel formed in said casing and communicating with said chamber of said bottle, and including a pathway formed in said casing and communicating with said channel of said casing, an inlet mouth engaged with said pathway of said casing, and a spring biased check valve disposed in said pathway of said casing for controlling the pressurized air to flow only from said inlet mouth into said channel of said casing.

2. The inflating device as claimed in claim 1, wherein said housing includes a sealing ring disposed on said valve piece for selectively engaging with said housing and for selectively making the air tight seal between said housing and said valve piece.

3. The inflating device as claimed in claim 2, wherein said valve piece includes a shank extended therefrom and engaged with said sealing ring.

4. The inflating device as claimed in claim 3, wherein said valve piece includes a peripheral flange extended therefrom and located around said shank for forming a peripheral recess between said shank and said peripheral flange and for engaging with said sealing ring.

5. The inflating device as claimed in claim 2, wherein said housing includes a compartment formed therein and communicating with said orifice of said housing for slidably engaging with said valve piece, and said compartment of said housing includes an inner diameter greater than that of said orifice of said housing for forming an inner peripheral shoulder in said housing and for engaging with said sealing ring.

6. The inflating device as claimed in claim 1, wherein said housing includes an inner thread formed therein, and a cap includes an outer thread engaged with said inner thread of said housing for detachably attaching said cap to said housing, said cap is engaged with said spring biasing member and retaining said valve piece and said spring biasing member within said housing.

7. The inflating device as claimed in claim 1 further comprising a knob engaged with said valve piece for moving said valve piece along said housing.

8. The inflating device as claimed in claim 7, wherein said housing includes a groove formed therein for slidably engaging with said valve piece.

9. The inflating device as claimed in claim 8, wherein said valve piece includes an aperture formed therein for selectively aligning with said groove of said housing and for engaging with said knob and for allowing said valve piece to be moved along said housing with said knob.

10. The inflating device as claimed in claim 1, wherein said casing includes a passage formed therein and communicating with said channel of said casing, a valve shank is slidably engaged in said channel of said casing and includes a bore formed in said valve shank and communicating with said channel of said casing, and includes a lateral slot formed in said valve shank for selectively aligning with said passage of said casing.

11. The inflating device as claimed in claim 10, wherein said control valve device includes a spring biasing member disposed in said channel of said casing and engaged between said casing and said valve shank for biasing and disengaging said lateral slot of said valve shank from said passage of said casing.

12. The inflating device as claimed in claim 10, wherein said casing includes a spring biased valve element engaged in said channel of said casing for controlling and guiding the pressurized air to flow through said bore of said valve shank.

13. The inflating device as claimed in claim 10, wherein said casing includes an actuating rod pivotally engaged in said casing, and said actuating rod includes a cam member for engaging with said valve shank and for selectively actuating and moving said lateral slot of said valve shank to align with said passage of said casing.

* * * * *